United States Patent [19]

Schwarz

[11] 4,304,422

[45] Dec. 8, 1981

[54] TUBE COUPLING WITH FRANGIBLE SLEEVE

[75] Inventor: Albert J. Schwarz, Lincolnwood, Ill.

[73] Assignee: Gould Inc., Rolling Meadows, Ill.

[21] Appl. No.: 122,211

[22] Filed: Feb. 19, 1980

[51] Int. Cl.³ .............................................. F16L 19/08
[52] U.S. Cl. ........................................ 285/4; 285/341; 285/382.7
[58] Field of Search ................... 285/3, 4, 382.7, 341, 285/342, 343

[56] References Cited

U.S. PATENT DOCUMENTS

| | | | |
|---|---|---|---|
| 2,935,339 | 5/1960 | Frederick | 285/382.7 X |
| 3,103,373 | 9/1963 | Lennon et al. | 285/382.7 X |
| 3,736,008 | 5/1973 | Crawford | 285/382.7 X |
| 3,893,716 | 7/1975 | Moreiras et al. | 285/382.7 X |
| 4,022,497 | 5/1977 | Kotsakis | 285/382.7 X |

FOREIGN PATENT DOCUMENTS

| | | | |
|---|---|---|---|
| 925028 | 3/1955 | Fed. Rep. of Germany | 285/3 |
| 2394736 | 2/1979 | France | 285/4 |
| 646787 | 11/1950 | United Kingdom | 285/3 |

Primary Examiner—Thomas F. Callaghan

[57] ABSTRACT

A conduit coupling is provided having a body member with an axial bore which is adapted to receive the end of a conduit. A fastening member also includes an axial bore and is adapted to surround the conduit and be secured to the body member. A sleeve having an axial bore is also adapted to surround the conduit and is axially positioned between the fastening member and the body member. The sleeve includes a frangible web for separating the sleeve into a plurality of elements in response to the application of an axially compressive force on the sleeve. Once the sleeve is separated, the plurality of sleeve elements cooperate with the fastening member and the body member to create a mechanically strong fluid-tight joint between the body member and the conduit.

7 Claims, 6 Drawing Figures

TUBE COUPLING WITH FRANGIBLE SLEEVE

BACKGROUND OF THE INVENTION

This invention relates generally to tube fittings and particularly to fittings for forming a strong fluid-tight joint between straight ended tubes and the fitting body.

Many types of tube fittings have heretofore been utilized for making a strong, fluid-tight connection between the fitting and the end of a tube of circular cross section. The present invention relates to an improvement in one class of these fittings generally known in the art as "bite-type" or flareless fittings. Such flareless fittings generally include a body member surrounding the end of the tube, a nut which also surrounds the tube and threadingly engages the body member, and one or more ferrules placed in axial compression between the nut and the body member and forced against the outer wall of the tube in a biting fashion. The ferrules are designed to create both a fluid-tight seal and a strong mechanical grip. An example of such a tube coupling is found in U.S. Pat. No. 2,484,815 to Crawford. The coupling shown in the Crawford patent includes two ferrules, one ferrule primarily being utilized to obtain a good fluid-tight seal and a second ferrule primarily employed to obtain a strong mechanical grip between the coupling and the tube. Although such two ferrule type fittings have generally worked well, there have been some problems and shortcomings associated with their use. Fittings of this general type are nearly always assembled or made up under field conditions by any one of a large number of technicians, any one of whom may have a relatively limited experience with a particular type of fitting. Thus, as one increases the number of parts in the fitting, as is the case in the two ferrule construction, one greatly increases the probability that the fitting will be improperly assembled. For example, in the type of fitting shown in the above-mentioned Crawford patent, it is possible for one to assemble the ferrules in as many as eight different ways. However, there is only one proper sequence and direction if adequate gripping and sealing is to be obtained.

To overcome the problem of improper assembly, which exists even with single ferrule designs, a number of couplings have been designed in which a sleeve is attached to the nut and fractures during assembly to create both a seal and a mechanical joint. Examples of such couplings appear in U.S. Pat. No. 1,889,778 to Dobrick, U.S. Pat. No. 3,743,324 to Schwarz, et al. and U.S. Pat. No. 4,022,497 to Katsakis. These couplings are generally effective in creating a reasonably strong good sealing joint. However, since couplings of this type result in the utilization of only a single ferrule for both sealing and mechanical strength, they generally do not perform as well as the aforementioned double ferrule design.

Another problem associated with fittings of this general type is the requirement that the biting edges of the ferrules be harder than the tubing to obtain a strong reliable mechanical connection. In the double ferrule type construction shown in the aforementioned Crawford patent, this requirement would particularly apply to the ferrule adjacent the nut. In certain chemical processes, it may be undesirable to have a fitting made of more than one material. For example, if corrosion resistance is required, it may be that the fitting must be made entirely of austenitic stainless steel and be suitable for use with tubing which is made of the same material. Austenitic stainless steel cannot be hardened by heat treatment, and suffers from a reduction in its corrosion resistance if it is hardened by known case-hardening methods; this means that there is no readily available technique for assuring that the biting edges of the ferrule are harder than the tubing in order to assure a strong connection.

An additional shortcoming of the double ferrule construction is that the cost of manufacturing additional parts increases the overall manufacturing costs of the coupling.

SUMMARY OF THE INVENTION

An aspect of the present invention is the provision of a conduit coupling having a body member with an axial bore which is adapted to receive the end of a conduit. A fastening member also includes an axial bore and is adapted to surround the conduit and be secured to the body member. A sleeve having an axial bore is also adapted to surround the conduit and is axially positioned between the fastening member and the body member. The sleeve includes at least one frangible web for separating the sleeve into a plurality of elements in response to the application of an axially compressive force on the sleeve. Once the sleeve is separated, the plurality of sleeve elements cooperate with the fastening member and the body member to create a mechanically strong fluid-tight joint between the body member and the conduit.

OBJECTS OF THE PRESENT INVENTION

An object of the present invention is the provision of a conduit coupling of the double ferrule type which greatly reduces the opportunity for improper assembly when compared with prior designs.

Another object of the present invention is the provision of a conduit coupling which may be manufactured of a single uniform material.

A further object of the present invention is the provision of a conduit coupling of the double ferrule type which is less expensive to manufacture than prior designs.

Yet another object of the present invention is the provision of a conduit coupling which generally requires less torque and fewer turns to assemble than prior designs.

Yet another object of the present invention is the provision of a conduit coupling which generally creates a stronger and better fluid-tight joint than prior designs.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
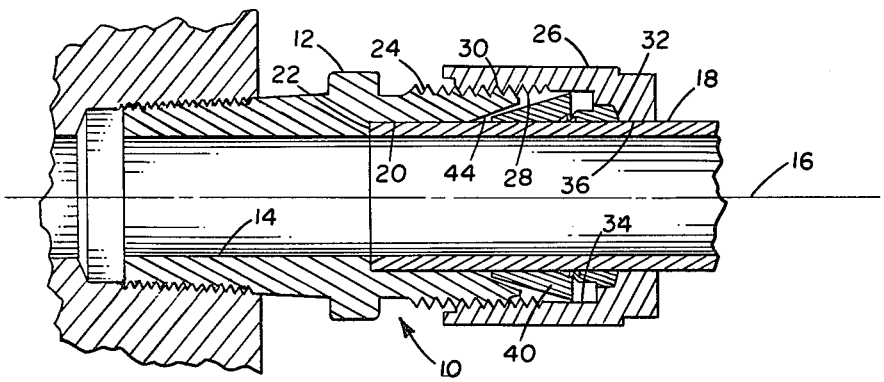
FIG. 1 is a longitudinal cross-sectional view of the conduit coupling of the present invention in the initial stages of assembly on the end of a conduit.

A first preferred embodiment of the present invention will now be described in connection with FIGS. 1 through 4. A conduit coupling generally shown at 10 includes a body member 12 having a bore 14 extending axially therethrough. The body member 12 is preferably symmetrical about the longitudinal axis 16. The body member 12 is adapted to receive the end of a straight section of conduit or tubing 18. The axial bore in body member 12 is stepped, in a known fashion, to include a bore of wider diameter 20 for receiving the end of tube 18. Thus, the tube 18 can be inserted into bore portion 20 until the end of the tube abuts a shoulder 22 created by the difference in the diameters of the bore 14 and the bore 20. The end of the body member 12 which receives the tube 18 preferably includes a male threaded portion 24 on the outer surface thereof.

A fastening member preferably in the form of a nut 26 has a stepped bore 28 extending axially therethrough. The bore 28 includes a female threaded portion 30 on one end thereof which is adapted to threadingly engage the male threaded portion 24 of body member 12. The threaded portions 24 and 30 serve as the sole means for securing the nut 26 to the body member 12. The nut 26 is also preferably symmetrical about axis 16. It should be understood that the fastening member could be secured to the body member 12 by an known means. The bore 28 is reduced at one end of the nut 26 to form an inclined shoulder 32 and a bore portion of reduced diameter 34. The portion of the bore of smallest diameter 36 is designed to fit about the outside of tube 18. The conduit coupling as thus far described is not novel and, in fact, is very similar to the coupling illustrated in the aforementioned U.S. Pat. No. 2,484,815 to Crawford.

Figure 3:
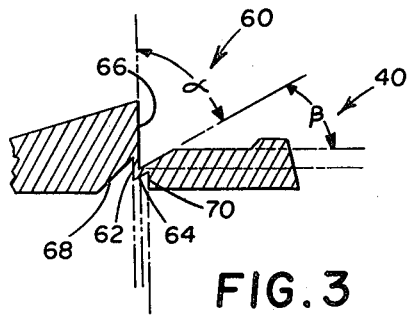
FIG. 3 is an enlarged view of a portion of the coupling shown in FIG. 2.
Figure 2:
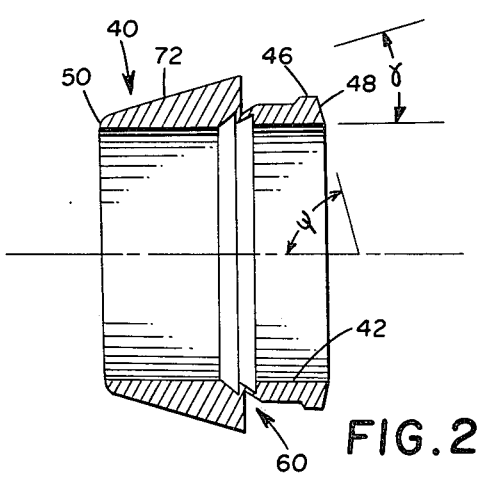
FIG. 2 is an enlarged longitudinal cross-sectional view of the sleeve of the coupling shown in FIG. 1.

The novel and improved features of the present invention all relate to the use of a sleeve 40, shown in detail in FIGS. 2 and 3, having a bore 42 extending axially therethrough. The bore 42 is adapted to surround the conduit 18. The bore portion 20 of body member 12 terminates in a frusto-conical portion 44 which forms a flared mouth facing down the outside surface of tube 18. The sleeve 40 is axially positioned between the surface 44 and the inclined shoulder 32 of nut 26. The sleeve 40 includes a first end 46 having a frusto-conical surface 48 adapted to engage the inclined shoulder 32 of nut 26. The surface 48 is inclined at an angle $\psi$ with respect to the axis of the sleeve. $\psi$ in this embodiment is 75°. The sleeve 40 also includes a second end 50, axially opposite the first end 46 which is adapted to engage the frusto-conical surface 44 of body member 12. As will become apparent in the discussion of the operation of the coupling of the present invention, the end 50 is relatively thin-walled and is therefore relatively easy to deflect or deform. Additionally, the surface 48 serves as a camming surface for deforming the end 50 radially inwardly as the coupling is assembled. Intermediate the ends of sleeve 40 is a portion 60 having a thickness which is substantially less than the thickness of the remainder of the sleeve. This portion of reduced thickness or web 60 constitutes a particularly novel feature of the sleeve of the present invention since it creates a means for separating the sleeve into a plurality of elements in response to an axially compressive force applied to the sleeve. The web 60 may be best seen in FIG. 3 and includes a wall portion 62 which is substantially perpendicular to the axis 16 of the sleeve and inclined portion 64 connected to the wall portion and defining an exterior acute angle $\alpha$ therebetween. In this embodiment, the angle $\alpha$ is 60°. Accordingly, the inclined portion 64 is inclined at an angle $\beta$ with respect to the axis of the sleeve. $\beta$ in this embodiment is 30°.

For reasons which will become apparent in the ensuing discussion of the operation of the coupling of the present invention, it is a particularly important feature of this invention that the inclined portions 64 have a significantly greater thickness than the wall portion 62. For example, in a sleeve having a bore one-half inch in diameter, the inclined portion 64 could have a thickness on the order of 0.010 inches and the wall portion 62 could have a thickness on the order of 0.004 inches. The web 60 has a V-shaped cross-section which is defined by an exterior shear groove 66 and two axially adjacent interior shear grooves 68 and 70. It should be understood that the web 60 could be formed utilizing only a single interior shear groove 68. However, as will become apparent from the ensuing discussion of the operation of the subject coupling, the additional interior shear groove 70 provides a means for forming a discontinuous surface on what will become a fractured ferrule. This discontinuous surface is adapted to engage the tube in two places along the length of the tube when the coupling is assembled thereon.

The sleeve 40 further includes a tapered external surface 72 adjacent the end 50 for mating with the frusto-conical surface 44 of body member 12. The tapered surface 72 forms an angle $\gamma$ with the longitudinal axis of the sleeve. The angle $\gamma$ is preferably on the order of 14° to 15° and more importantly, for reasons discussed later, is significantly less than either the angle $\beta$ or the angle $\psi$. Although the body member, the fastening member and the sleeve of the coupling of the present invention can be made of any known materials, and need not be made of the same material, in the preferred embodiment of the present invention these elements are all made of austinitic stainless steel.

In assembling the coupling of the present invention, the user merely inserts the end of the tube 18 through the bore 36 in nut 26, through the bore 42 of sleeve 40 and into the bore 20 of body member 12 until the end of the tube abuts shoulder 22. The nut 26 and sleeve 40 are then manually advanced along the tube until the nut 26 begins to threadingly engage the body member 12. The nut may then be manually tightened until the end 50 of sleeve 40 engages the frusto-conical surface 44 of body member 12. At this point, the fitting appears as shown in FIG. 1.

Figure 4:
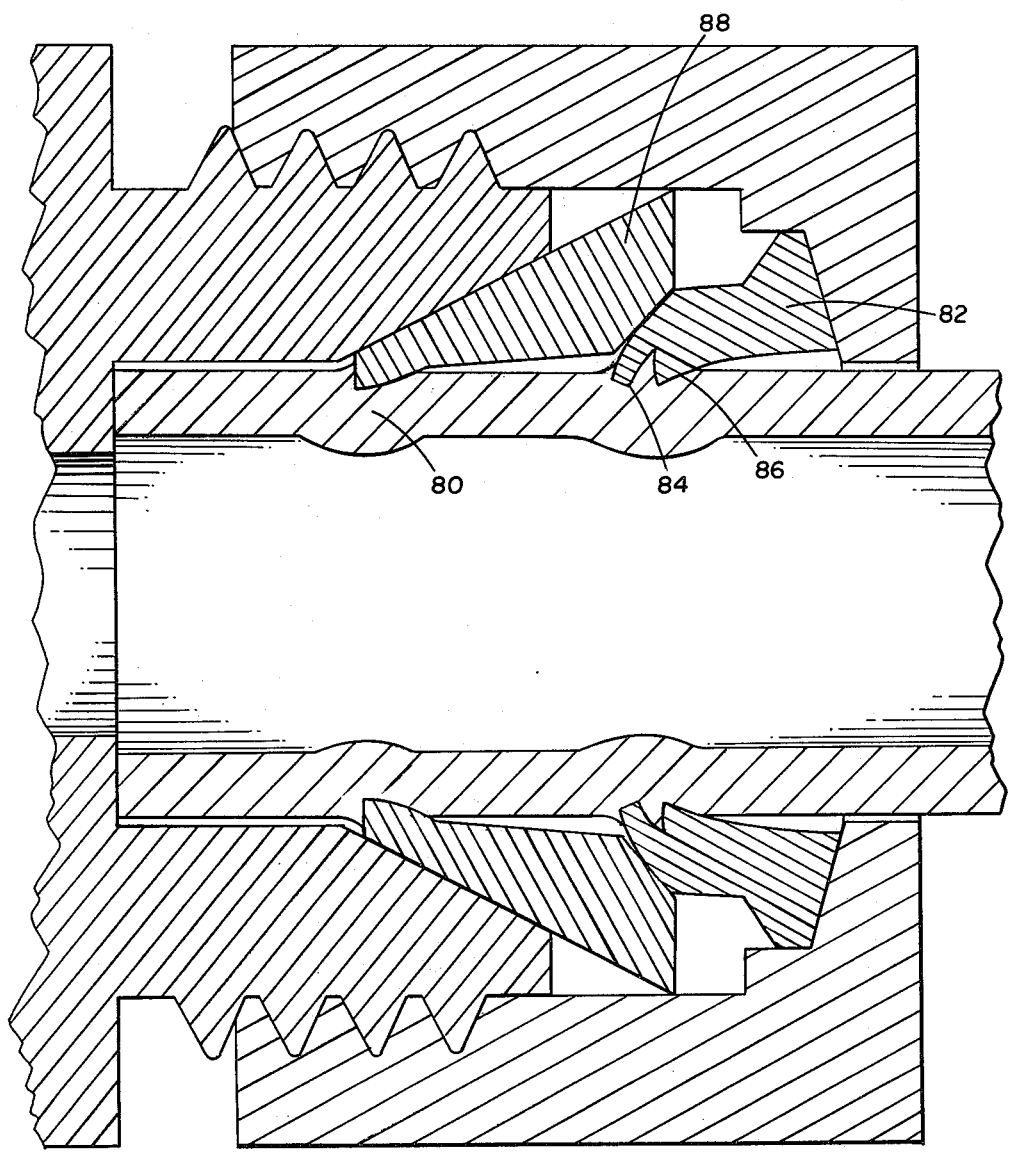
FIG. 4 is a longitudinal cross-sectional view of the conduit coupling of the present invention in final assembled form on the end of a conduit.

The nut 26 may then be forcibly torqued creating an axially compressive force on the sleeve 40. As is best seen in FIG. 4, the axially compressive force on the sleeve 40 causes the web 60 to deform and stretches the web in an axial direction until it fractures. Because the wall portion 62 has a thickness which is considerably less than that of the inclined portion 64, the fracture will occur in the wall portion 62 of web 60. Simultaneously with this axial compression and fracturing of the sleeve, the tapered surface 72 is radially compressed by the frusto-conical surface 44 causing the end 50 of sleeve 40 to sealingly engage and grip the tube at 80.

After the web 60 has fractured, the nut 26 may be further torqued causing the now separated rear sleeve element 82 to cut a double groove in the outer surface of the tube 18 at 84 and 86. As was mentioned earlier, the shearing of wall 62 creates a discontinuous surface along the inner surface of the element 82 which results in this dual engagement and gripping of the tube.

It should be noted that in the initial tightening process before the web fractures that since the angle γ is substantially less than either the angle α or the angle ψ and since the area of surface contact of the surfaces 72 and 44 is greater than the area of surface contact between the surfaces 48 and 32, the frictional grip between the sleeve 40 and the body 12 will exceed the frictional grip between the sleeve 40 and the nut 26. Accordingly, initially, rotation of the nut will not be transferred to the sleeve 40 and correspondingly will not be transferred to the tube 18. Thus, twisting of the tube is prevented. As was mentioned earlier, the relative steepness of the surface 48 results in a camming action which has a tendency to cam the deformable end 50 radially inwardly as the nut is advanced. Furthermore, should any frictional torsional coupling between the nut 26 and the sleeve 40 be created, a torsional stress will be created in the web 60. This torsional stress in the web 60 will increase the total stress in the web, further assuring that fracturing of the web will occur before the tube 18 can be caused to rotate.

Once the web has fractured, the element 82 is free to rotate with the nut 26 on further torquing of the nut and can act as a thrust washer bearing, thereby reducing the tendency of the nut 26 to transmit torque to the tube 18 in the same manner as would a conventional dual ferrule fitting. Additionally, the wall portion 62 is deformed between the element 82 and the newly formed sealing element 88 and serves to seal the junction between the elements 88 and 82 and the tube 18. The wall portion 64 is deformed radially inwardly by the conical surface of element 88, causing it to block off the space between the element 88 and the tube 18. This blockage and the associated bite 84 cooperate with the bite 86 to strengthen the tube against failure by shaving or skiving action, so that the strength of the combined bites 84 and 86 is at least equal to that of the deeper single bite which would be produced by a single conventional sleeve. It should be understood that the deformation of the tube and sleeve elements shown in FIG. 4 is merely an approximation of the appearance of an assembled conduit coupling in accordance with the present invention. In every instance, the degree of deformation and bite will, of course, be slightly different.

In practice, it has been found that a fitting of the type described in FIGS. 1 through 4 seals exceedingly well while also requiring less torque and fewer turns to assemble than most prior fittings.

A second embodiment of the conduit coupling of the present invention will now be described in connection with FIGS. 5 and 6. In couplings for use on relatively small diameter tubing, generally of ⅜" diameter or less, it becomes difficult to cut the interior shear grooves 68 and 70 demonstrated in FIG. 3 with respect to the first embodiment of this invention. However, it is known that the fluid pressure generated force tending to separate the tube from the fitting is proportional to the cross-sectional area of the tube and thus to the square of the diameter of the tube. Conversely, the holding ability of a fitting is proportional to the length of the gripping member and, therefore, is proportional to the diameter of the tube and not the square of the diameter. Thus, when designing fittings for smaller diameter tubes, proportionally much less gripping power is required to obtain the same magnitude of pressure seal.

Figure 5:
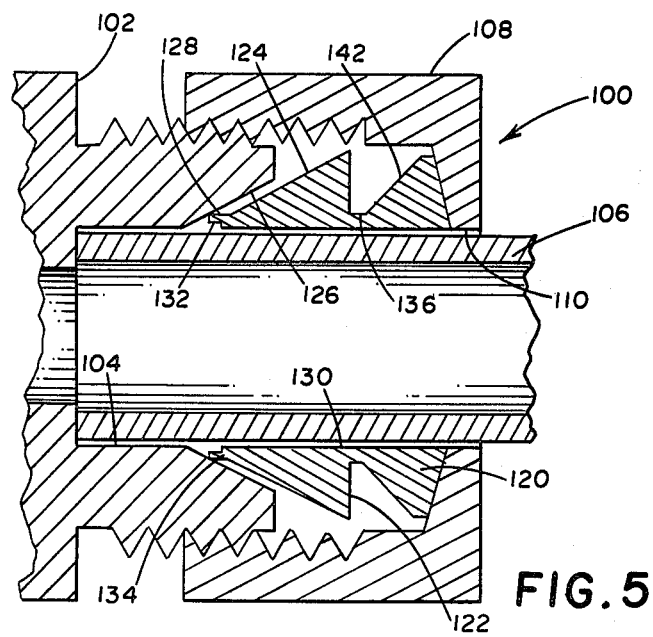
FIG. 5 is a longitudinal cross-sectional view of a second embodiment of the conduit coupling of the present invention in the initial stages of assembly on the end of a conduit.
Figure 6:
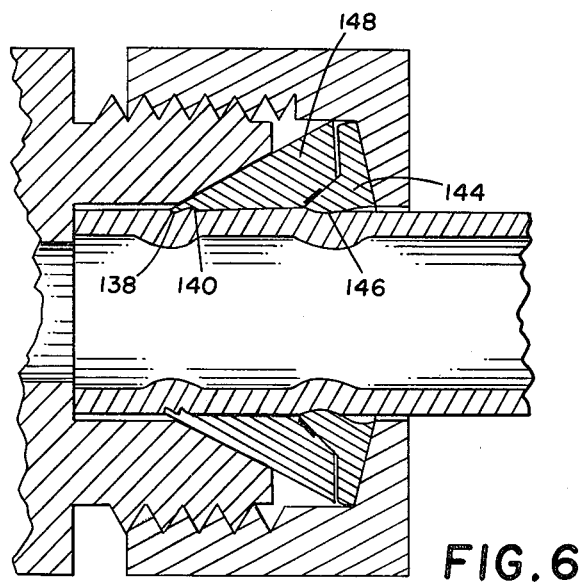
FIG. 6 is a longitudinal cross-sectional view of the conduit coupling shown in FIG. 5 in final assembled form.

Accordingly, a simplified version of the present invention is illustrated in FIGS. 5 and 6. A coupling 100 generally includes a body member 102 having an axial bore 104 adapted to receive the end of the small diameter tube 106. A nut 108 threadingly engages the body member 102 in a known fashion. The nut 108 includes a bore 110 for surrounding the tube 106. Once again, the nut 108 and the body member 102 are similar to prior coupling designs and in and of themselves are not novel. The coupling 100 is provided with a sleeve 120 which interacts with the body member 102 and the nut 108 in much the same fashion that the sleeve member 40 interacts with the body member 12 and the nut 26 in the first embodiment of the present invention. The sleeve 120, however, differs from the sleeve 40 in that it includes an external shear groove 122 and no internal shear grooves. The sleeve 120 includes a tapered external surface 124 for mating with a corresponding frusto-conical surface 126 of body member 102. However, in this embodiment, the tapered surface 124 terminates at one end in a cylindrical surface 128. The sleeve 120 has an axial bore 130 which has a generally smooth cylindrical surface, with the exception that it is discontinuous along the end adjacent the body member 102. At this end, an annular notch 132 is cut into the sleeve concentric with the cylindrical surface 128. The notch 132 is sufficiently deep so as to form a cylindrical projection 134 on the end of the sleeve which is sufficiently thin walled so as to be deformed radially inwardly during the assembly of the fitting. A web 136 interconnects the portion of the sleeve adjacent the nut to the portion of the sleeve adjacent the body member.

The coupling shown in FIGS. 5 and 6 is assembled in much the same manner as the coupling of the first embodiment of the present invention. As the nut 108 threadingly engages the body member 102, the tapered surface 124 engages the frusto-conical surface 126 of the body member 102 and is deformed radially inwardly. Simultaneously, the projection 134 is deformed radially inwardly so that the notch 132 engages and grips the tube 106 in a double biting action at points 138 and 140. This biting action is similar to the double biting action produced by element 82 in FIG. 4 and produces similar beneficial results. As further torquing is applied to the nut 108, the web 136 fractures under axial compression and the tapered surface 142 is pressed against and deformed by the tube creating a tight friction grip between the newly formed element 144 and the tube 106 at point 146. The web 136 is deformed between the second newly formed element 148 and the element 144 to seal the joint between those two elements. The friction grip between the element 144 and tube 106 gives the coupling some additional axial blow-off resistance under fluid pressure and also isolates the grip at points 138 and 140 from the effects of vibration of the tubing external to the fitting.

Thus, it is apparent that a new conduit coupling has been developed which greatly reduces the opportunity for improper coupling assembly by utilizing only a single sleeve in the assembly process while simultaneously providing a double ferrule type coupling. The coupling of the present invention may be manufactured of a single uniform material and is considerably less expensive to manufacture than conventional double ferrule designs. In most instances, the coupling of the present invention requires less torque for assembly than prior designs. Additionally, the coupling of the present invention requires only 1 and ½ turns of the nut for assembly, which is less than many prior designs. Thus, overall assembly is easier. All of the above advantages are obtained while the coupling of the present invention also creates a stronger and better fluid-tight joint than most prior designs.

While there have been described what are at present considered to be the preferred embodiments of the present invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A conduit coupling comprising:
   a body member having a bore extending axially therethrough and adapted to receive an end of a conduit;
   a fastening member having a bore extending axially therethrough and adapted to surround a conduit, said fastening member and said body member including means for securing said fastening member to said body member; and
   a structurally integral sleeve having a bore extending axially therethrough and adapted to surround a conduit, said sleeve being axially positioned between said body member and said fastening member and comprising a first element engageable with said body member and a second element engageable with said fastening member, said sleeve further comprising a web intermediate said first and second elements and having a thickness substantially less than the thickness of the remainder of said sleeve, said web fracturing in response to an axial compressive force applied to said sleeve and separating said sleeve into said first and second elements, said web including a wall portion substantially perpendicular to the longitudinal axis of said sleeve and connecting said web to said first element, said perpendicular wall portion and said first element defining a first interior groove therebetween facing generally radially inwardly of said web, said web further including a wall portion inclined to the longitudinal axis of said sleeve and connecting said web to said second element, said inclined wall portion and said second element defining a second interior groove therebetween facing generally radially inwardly of said web, said perpendicular and inclined wall portions being connected and defining an exterior groove therebetween facing generally radially outwardly of said web, the thickness of said inclined wall portion being substantially greater than the thickness of said perpendicular wall portion whereby said perpendicular wall portion fractures in response to an axial compressive force applied to said sleeve, each of said first and second elements having an end portion deformable radially inwardly for grippingly engaging a conduit when said coupling is assembled on an end of a conduit, said web forming the axial extremity of said second element end portion upon fracturing of said perpendicular wall portion with said second interior groove forming a discontinuous surface for grippingly engaging a conduit in two places along the length thereof upon radially inward deformation of said second element end portion, whereby said deformable end portions in cooperation with said fastening member and said body member serve to create a mechanically strong fluid-tight joint between said body member and a conduit when said coupling is assembled on an end of a conduit.

2. A coupling as set forth in claim 1, wherein said exterior groove defines an angle of approximately 60°.

3. A coupling as set forth in claim 1, wherein said first sleeve element includes a camming surface inclined at a first angle with respect to the longitudinal axis of said sleeve, said second sleeve element includes a camming surface inclined at a second angle with respect to said sleeve axis, and said inclined wall portion of said web is inclined at a third angle with respect to said sleeve axis, said first angle being substantially smaller than either said second angle or said third angle.

4. A coupling as set forth in claim 1, wherein said deformable end portions are proximate said body member to provide maximum resistance to axial movement of a conduit gripped by said end portions in the direction away from said body member.

5. A coupling as defined in claim 1, wherein said fastening member is a nut and wherein said means for securing said fastening member to said body member includes threads on said nut and said body member to enable said nut to threadingly engage said body member.

6. A coupling as set forth in claim 1, wherein said body member, said fastening member, and said sleeve are made of the same material.

7. A coupling as set forth in claim 6, wherein said material is austinitic stainless steel.

* * * * *